(12) United States Patent
Miao (10) Patent No.: US 7,091,854 B1
(45) Date of Patent: Aug. 15, 2006

(54) MULTIPLE-INPUT MULTIPLE-OUTPUT WIRELESS SENSOR NETWORKS COMMUNICATIONS

(76) Inventor: George J. Miao, 2 Inverness Dr., Marlboro, NJ (US) 07746

( * ) Notice: Subject to any disclaimer, the term of this patent is extended or adjusted under 35 U.S.C. 154(b) by 187 days.

(21) Appl. No.: 10/822,252

(22) Filed: Apr. 9, 2004

(51) Int. Cl.
*G08B 1/08* (2006.01)

(52) U.S. Cl. .............. 340/539.26; 340/539.1; 340/521; 340/531

(58) Field of Classification Search ............ 340/539.1, 340/539.26, 539.29, 521, 3.1, 506, 825.36, 340/870.01, 10.33, 7.32, 531, 511; 701/117, 701/29, 213, 14
See application file for complete search history.

(56) References Cited

U.S. PATENT DOCUMENTS

| | | | | |
|---|---|---|---|---|
| 5,283,549 A | * | 2/1994 | Mehaffey et al. ........... | 340/521 |
| 6,084,522 A | * | 7/2000 | Addy .......................... | 340/630 |
| 6,246,320 B1 | * | 6/2001 | Monroe ....................... | 340/506 |
| 6,469,639 B1 | * | 10/2002 | Tanenhaus et al. .... | 340/870.16 |
| 6,624,750 B1 | * | 9/2003 | Marman et al. ............ | 340/506 |
| 6,919,803 B1 | * | 7/2005 | Breed ..................... | 340/539.14 |

* cited by examiner

*Primary Examiner*—Anh V. La (57) ABSTRACT

This invention presents a MIMO wireless sensor networks communication, which is expected to utilize a larger of size sensor nodes in commercial environments, potentially hostile and militarily sensitive environments. Every sensor node of the MIMO sensor networks communication is to support data collection, signal processing and analysis, and transmission fashion. The present invention also develops novel approaches of advanced space-time processing with the MIMO sensor-antenna architecture, spread spectrum, and adaptive communication signal processing that simultaneously exploit temporal and spatial diversity for seamless sensor networks communications, thereby converting spatially distributed sensor nodes into efficient, robust, reliable, and secure wireless sensor networks communications.

22 Claims, 7 Drawing Sheets

MULTIPLE-INPUT MULTIPLE-OUTPUT WIRELESS SENSOR NETWORKS COMMUNICATIONS

BACKGROUND

This invention is generally relative to a Multiple Input Multiple Output Multiple-Input Multiple-Output wireless sensor networks communication.

Conventional deployments of sensor networks communication often scatter multiple sensors over a limited geographic region in order to collect data of interest. The collected data is then analyzed to expeditiously achieve or facilitate a given mission objective. It does not matter whether the collected data is continued surveillance, reconnaissance, target identification, registration and disposition, or anything else along those lines. In the sensor networks communication, each sensor device is expected to reliably and securely transmit its data to a communication receiver for further analysis, pattern recognition, coordination, and processing during various time intervals. Usually, each sensor has a single antenna while the communication receiver is equipped with an antenna array, which has many elements. Different sensors in the sensor networks communication may be responsible for different levels of throughput and fidelity depending on a particular task. In addition, some sensors in the sensor networks communication may have to provide several transmissions within a short-time interval while as other sensors may only transmit at irregular intervals or even not at all. Thus, resource allocations of the sensor networks communication need be determined and continually reassessed so that accommodations of such versatility can be achieved in performance.

The further sensor networks communications are envisioned to contain a large number of sensor nodes, each capable of some limited computation, communication and sensing capabilities, operating in an unattended mode with limited energy. They are also characterized by severe energy constraints because the sensor nodes will often operate with finite battery resources and limited recharging. Generally speaking, they have the following properties: (1) A sensor network communication is composed of a large number of sensor nodes that are densely deployed either inside the phenomenon or very close to it; (2) Sensor nodes in the sensor networks communications are prone to failures; (3) A topology of the sensor networks communications changes very frequently; (4) Sensor nodes in the sensor networks communications mainly use a broadcast communication paradigm; (5) Sensor nodes in the sensor networks communications are limited in power, computational capacities, adaptive communication signal processing, transmission, and memory; and (6) in addition, in some cases, sensor nodes of the sensor networks communications may not have global identification because the sensor networks communications use a larger amount of overhead and large number of sensors.

A sensor networks communication has numerous applications. One of the applications is used to monitor and control safely critical military and governmental environments such as domestic infrastructure systems. In this case, the application may include battlefield detection and protection systems for biological, chemical and/or radiological weapons, aiding areas hit by disasters. Another of the applications is used for homeland security at airports, bridges, public building, and major subway train systems. A third-one of the applications is used for tracking. For example, a ship in the ocean emits sounds that may be detected and characterized by several underwater senor networks. As the ship moves, the bearing measurements slowly change. A fourth-one of the applications is in smart spaces that may include semiconductor and/or manufactory facilities, smart building, cities, and even sensitive laboratories. A fifth-one of the applications is used to monitor ground temperature such as a forest to detect fast moving forest fires. A sixth-one of the applications is in entertainment environments including amusement parks and/or museums. In addition, other applications are in health case systems such as higher-age health monitor and/or patient health and movement status at home environment. As can be seen, the sensor networks communication has tremendous application value not only in military battlefield but also in commercialization.

Recent advances in integrated circuits technology have enabled mass production of tiny, cost-effective, and energy-efficient seamless sensor devices with processing capabilities. The seamless sensor devices are usually equipped with a sensor module in which detects via electrical/electromagnetic fields, acoustics, optical, movement, chemicals, biological agents, radiation, environmental factors such as humidity, temperature, and so on. Characteristics of the seamless sensor devices to be considered are size, battery consumption, energy level, lifetime, movement whether a sensor is mobile or must remain stationary, position that the sensor may be embedded or may be independent of its surroundings, redundancy for checking integrity, and failure modes. The malfunctions may indicate that the sensor has failed, is degrading slowly, or possesses a bad behavior such as going up and down randomly.

Advanced sensor networks communication is expected to utilize a larger of size sensor nodes, such as 1000, or even more individual sensor nodes in potentially hostile and militarily sensitive environments. Every sensor node of the sensor networks communication is likely to support data collection and transmission in an efficient, robust, reliable and secure communication fashion. The sensor network communication will encounter to have multipath propagation because sensor network elements are not likely to be guaranteed a line-of-sight transmission path to a communication receiver, which is not promised to remain at a fixed position for any period of time. The multipath propagation arises from scattering, reflection, refraction or diffraction of the radiated energy off objects in the environment. Thus, received signals from sensor nodes are much weaker than transmitted signals due to mean propagation loss. In addition to a mean path loss, the received signals exhibit fluctuations in a signal level that is referred to fading. Moreover, the sensor networks communication may also have interference, such as co-channel interference (CCI), adjacent-channel interference (ACI), and intersymbol interference (ISI). On the other hand, the sensor networks communication may likely have jam resistant in a hostile and militarily sensitive or a battlefield. Therefore, to effectively operate under the abovementioned constraints, we invent using adaptive novel communication signal processing approaches of space-time processing along with MIMO-based multi-sensor code division multiple access (CDMA) architecture for the sensor networks communication.

The present invention of the MIMO-based wireless sensor networks communication is not only responsible for frequency selection, carrier frequency generation, interleaver, error coding, channel estimate, signal detection, modulation, and source data encryption as well as strategies that overcome signal multipath propagation effects, but also responsible for architecture schemes including tiny, low-power, low-cost communication transceiver, sensing, analog-to-digital (A/D) and digital-to-analog (D/A) converters, and computing processing units and low power-efficient methods. Thus, there is a continuing need of the MIMO-based wireless sensor networks communication.

SUMMARY

In accordance with one aspect, a multiple-input multiple-output wireless sensor networks communication system comprises N wireless sensor node and transceiver systems, where N is an integer; each of the wireless sensor node and transceiver systems coupled to M antennas, where M is an integer; a wireless multiple-input multiple-output space-time sensor basestation system coupled to a sensor network interface that is connected to a sensor network; and wireless multiple-input multiple-output space-time sensor basestation system coupled to P antennas, where P is an integer.

Other aspects are set forth in the accompanying detailed description and claims.

DETAILED DESCRIPTION

Some embodiments described herein are directed to the MIMO wireless sensor networks communication transceiver system. It may be implemented in hardware, such as in an Application Specific Integrated Circuits (ASIC), digital signal processor, field programmable gate array (FPGA), software, or a combination of hardware and software.

MIMO Wireless Sensor Networks Communication System

Figure 1:
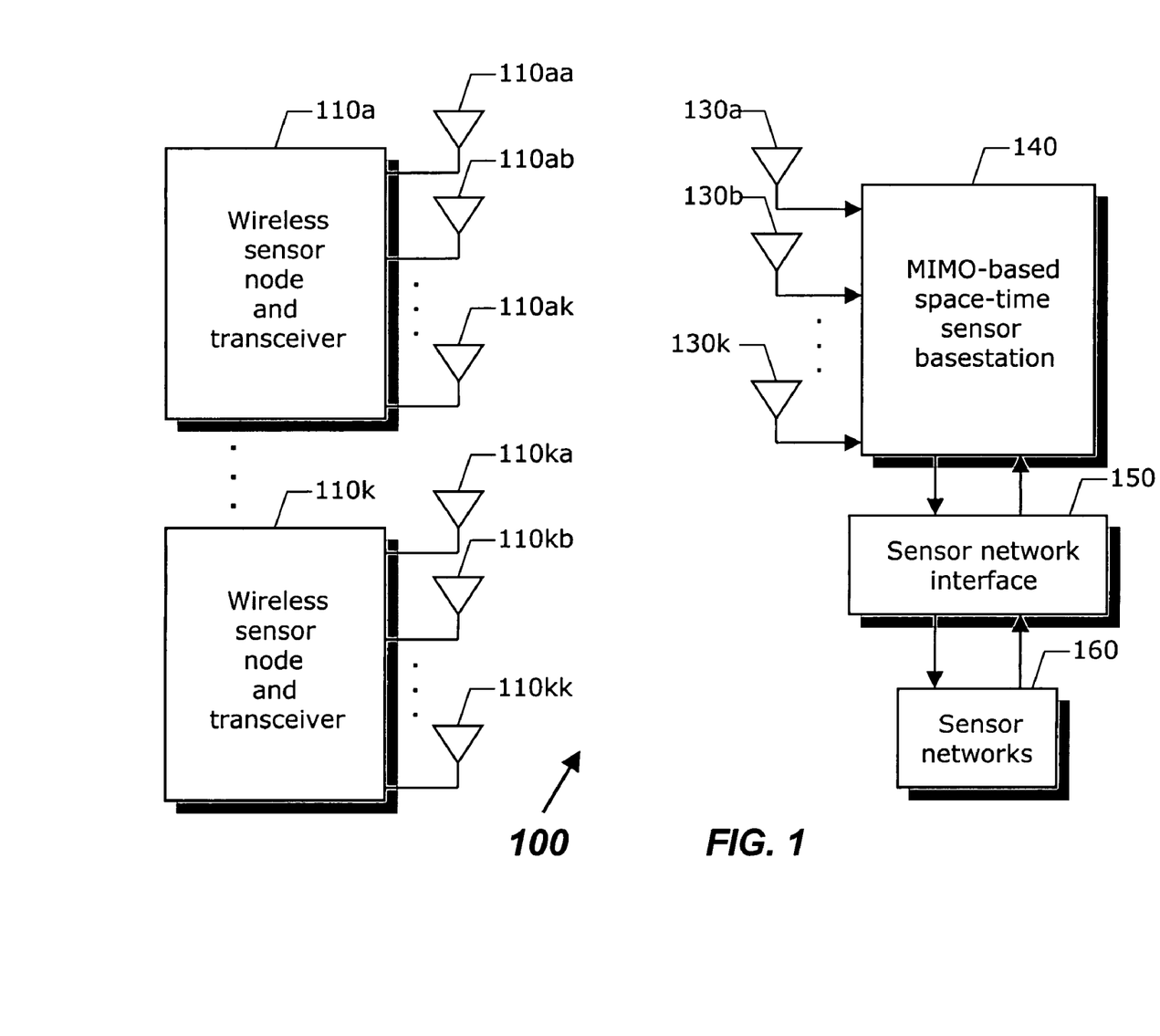
FIG. 1 is a block diagram of showing a MIMO wireless sensor networks communication according to some embodiments.

A MIMO sensor networks communication transceiver system 100 for wireless communications is shown in FIG. 1 in accordance with one embodiment of the present invention. A number of K wireless sensor nodes and transceiver systems from 110a to 110k can simultaneously communicate with a MIMO sensor basestation 140. The wireless sensor node and transceiver 110a transmits and receives signals through its multiple antennas from 110aa to 110ak. The MIMO sensor basestation 140 communicates with the wireless sensor node and transceiver 110a through its multiple antennas of 130a to 130m. In a similar way, other wireless sensor nodes and transceivers of 110b to 110k also transmit and receive the information data through their multiple antennas, respectively, and communicate with the MIMO sensor basestation 140 through the multiple antennas of 130a to 130m. The MIMO sensor basestation 140 is coupled to a sensing network interface 150, which is also connected with a sensor network 160 for processing data information.

The MIMO sensor basestation 140, with knowing all of pseudorandom sequences of the wireless sensor nodes and transceivers of 110a to 110k, can transmit and receive all of information data from all of the wireless sensor nodes and transceivers of 110a to 110k by spreading and despreading of the wireless sensor's pseudorandom sequences. The MIMO sensor basestation 140 can use a BPSK or a QPSK or other modulations to transmit and to receive the information data rate on one frequency band. In the present invention, because of using of the multiple antennas in the wireless sensor nodes and transceivers from 110a to 110k and the MIMO sensor basestation 140, the MIMO wireless sensor networks communication transceiver system 100 is able to transmit the data rate with an enhancement of a longer range. Moreover, the present invention can simultaneously exploit temporal and spatial diversity for wireless sensor networks communication, thereby enabling spatially distributed sensor node networks into efficient, robust, reliability reliable, and secure wireless sensor networks communication.

Different sensor nodes in the MIMO sensor networks communication may be responsible for different levels of throughput and fidelity depending on a particular assigned task. In some cases, some wireless sensor nodes of the MIMO sensor networks communication may have to provide several transmissions within a short-time interval while other wireless sensor nodes may only transmit at irregular intervals or even not at all. Thus, the MIMO sensor networks communication 100 as shown in FIG. 1 is also used to determine and continually reassess resource allocations so that accommodations of such versatility can be achieved in performance for wireless sensor networks communication.

The present invention of the MIMO sensor networks communication transceiver system 100 simultaneously utilizes multiple antennas on both transmitter and receiver by processing signal samples both in space and time. In the MIMO sensor receiver, space-time processing can increase array gain, spatial and temporal diversity and reduce CCI and ISI. In MIMO sensor transmitter, the spatial dimension can enhance array gain, improve diversity, and reduce generation of CCI and ISI. Thus, the present invention of the MIMO sensor networks communication transceiver system 100 mainly trends to use temporal signal processing. This is because use of the spatial-temporal signal processing can improve average signal power, mitigate fading, and reduce CCI and ISI, thereby significantly improving the capacity, coverage, and quality of wireless seamless sensor networks communication. In addition, dual-transmit diversity can boost the data rate not only on uplink channel but also on downlink channel, which allows the sensor basestation to control sensor nodes. As a result, these wireless sensor node networks become as smart sensors since the sensor nodes can be fully controlled by the MIMO sensor basestation in addition to self-control on the sensor nodes.

The main task of the MIMO wireless sensor networks communication system 100 is to detect events, perform quick local data processing, and then transmit the information data over the MIMO wireless communication channels.

MIMO Sensor Node and Transceiver Architecture

Figure 2:
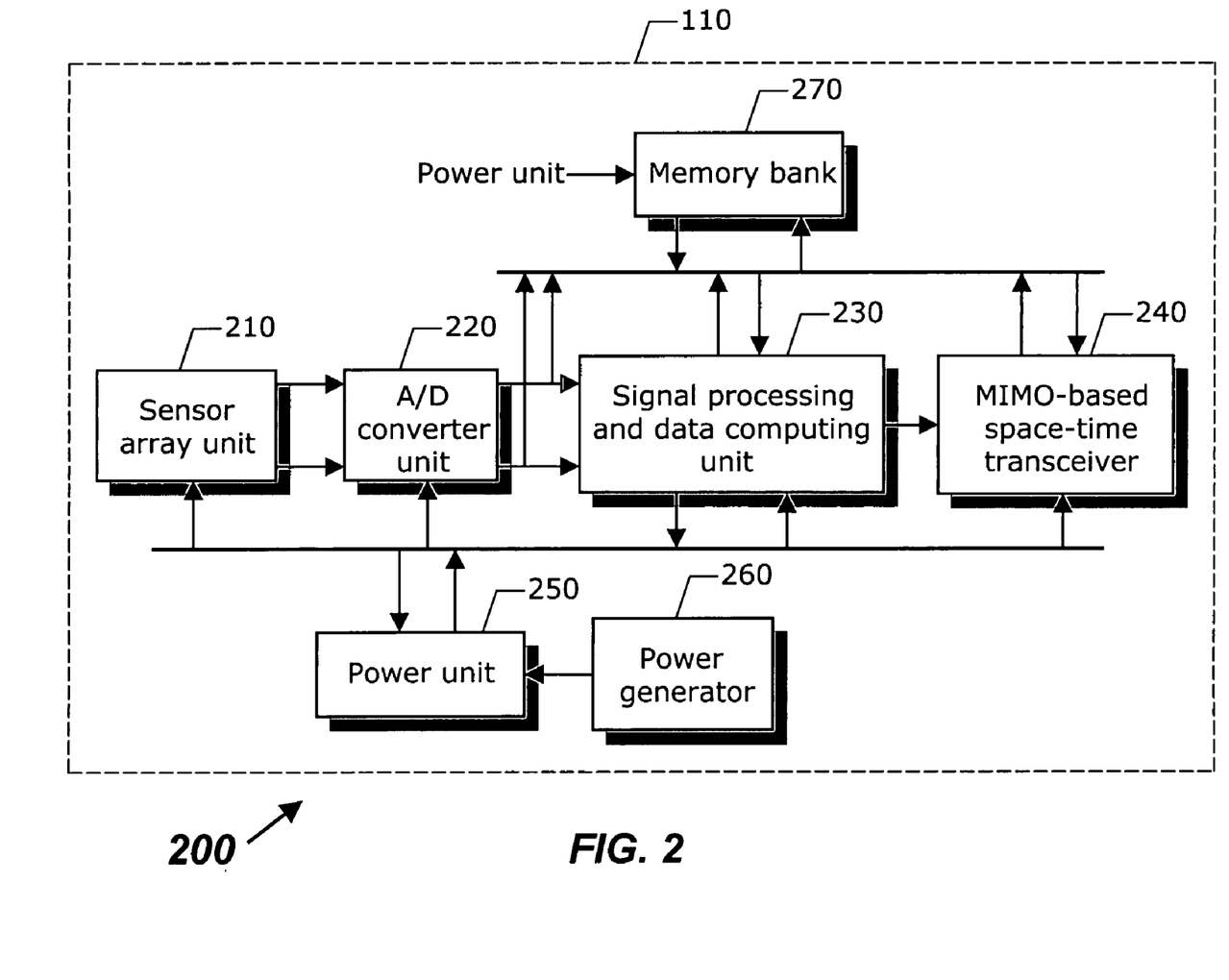
FIG. 2 is a block diagram of showing MIMO wireless sensor node structure and transceiver architecture according to some embodiments.

FIG. 2 is a block diagram 200 of showing the MIMO sensor node and transceiver 110 according to some embodiments. The MIMO sensor node and transceiver 110 includes a sensor array unit 210, an A/D converter unit 220, a signal processing and data computing unit 230, MIMO transceiver 240, a power unit 250 coupled with a power generator 260, and a memory bank 270. The sensor array unit 210 contains M sensor nodes in parallel to form an array. Each of these sensors is a multimode sensor device, which can be turned to sensor different input signals. The sensor can be one of electronic, optical, chemical, nuclear fusion, gas/liquid, or any combination sensing that made by using properties of integrated electrical, optical, piezoelectric, and even chemical materials, and so on. The sensor array unit 210 is coupled to the A/D converter unit 220. The A/D converter unit 220 can have one or several A/D converters in a parallel form to convert the input analog signals based on the observed phenomenon into digital signals and then feeds into the signal processing and data computing unit 230. The A/D converter unit 220 is also connected to the memory bank 270, which serves as a pool memory storage in the MIMO sensor node and transceiver. The signal-processing and data computing unit 230, which is coupled to the memory bank 270 and the MIMO transceiver 240, manages the procedures that make the sensor node to collaborate with the other sensor nodes and move the sensor node with the knowledge of location in a high accuracy when it is required to carry out the assigned sensing tasks. In addition, the signal processing and data computing unit 230 performs the signal processing based on the collected data to provide surveillance, reconnaissance, target identification, registration and disposition, or anything else along those lines and then passes the useful data information into the MIMO transceiver 240. That is, instead of sending the raw data to the MIMO sensor basestation 140 (see in FIG. 1) responsible for the fusion, the signal processing and data computing unit 230 use its processing abilities to locally carry out simple computations and provides only the required and partially processing data for transmitting. The MIMO transceiver 240 is expected to reliably and securely transmit its data to the MIMO sensor basestation 140 for further analysis, pattern recognition, coordination, and processing during various time intervals. The MIMO sensor node and transceiver system 200 is supported by the power unit 250, which is coupled to the power generator 260. The power generator 260 may be a set of solar cells, low-power DC source, or any combinations. The power unit 250 is needed to support three major domains: sensing, signal and data processing and communication.

Figure 3:
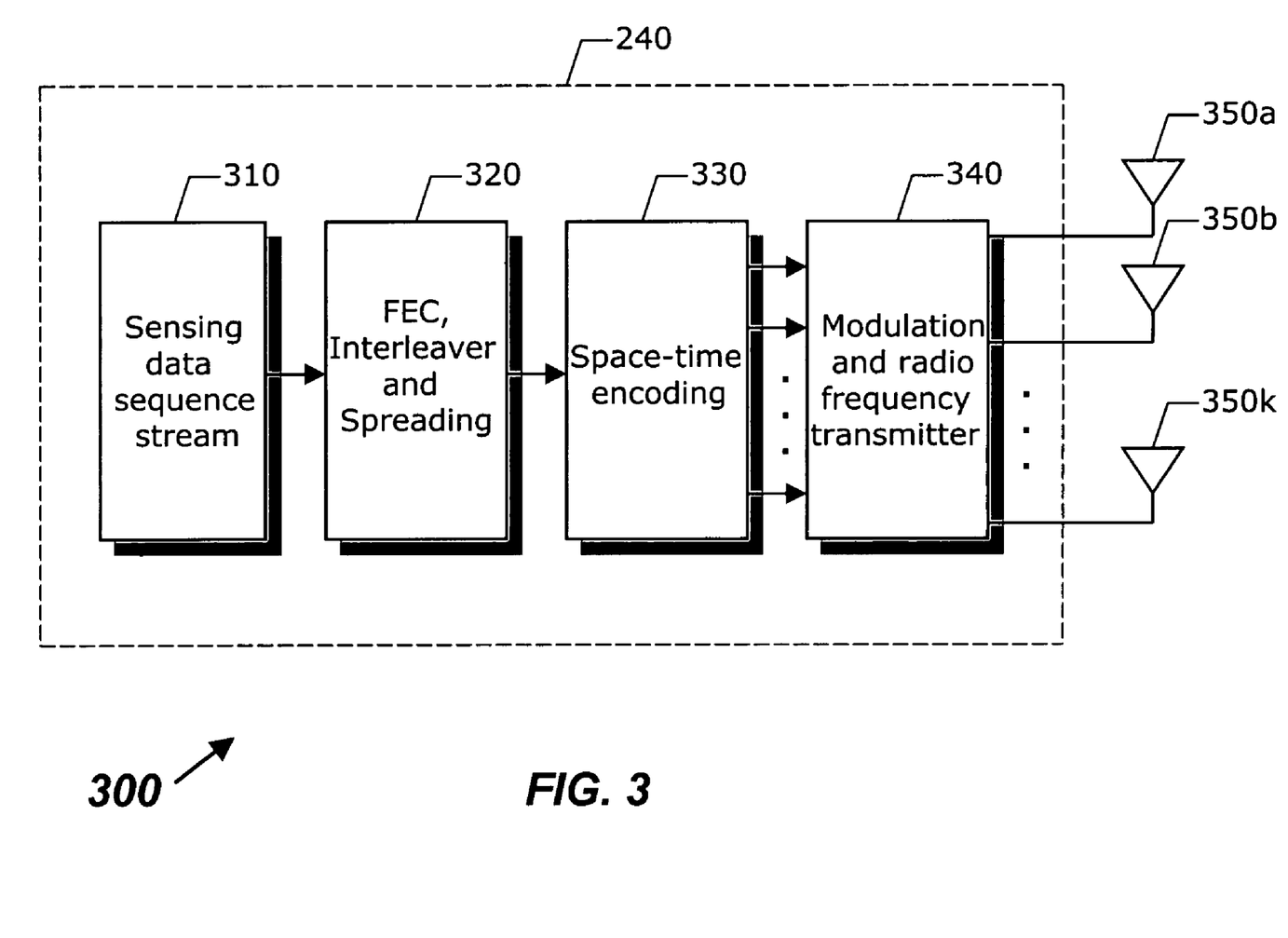
FIG. 3 is a detailed block diagram of showing a MIMO transceiver according to some embodiments.

Referring to FIG. 3 is a detailed block diagram 300 of showing a MIMO transceiver 240 according to some embodiments. A sensing data sequence stream 310 is coupled to a forward error correction (FEC), interleaver and spreading 320. The FEC, interleaver and spreading 320 is connected with a space-time encoding 330 to produce space-time signal sequences in parallel form and feeds them into a modulation and radio frequency transmitter 340. The modulation and radio frequency transmitter 340 performs modulation and carrier-based radio signals into air via multiple antennas of 350a, 350b to 350k.

Figure 4:
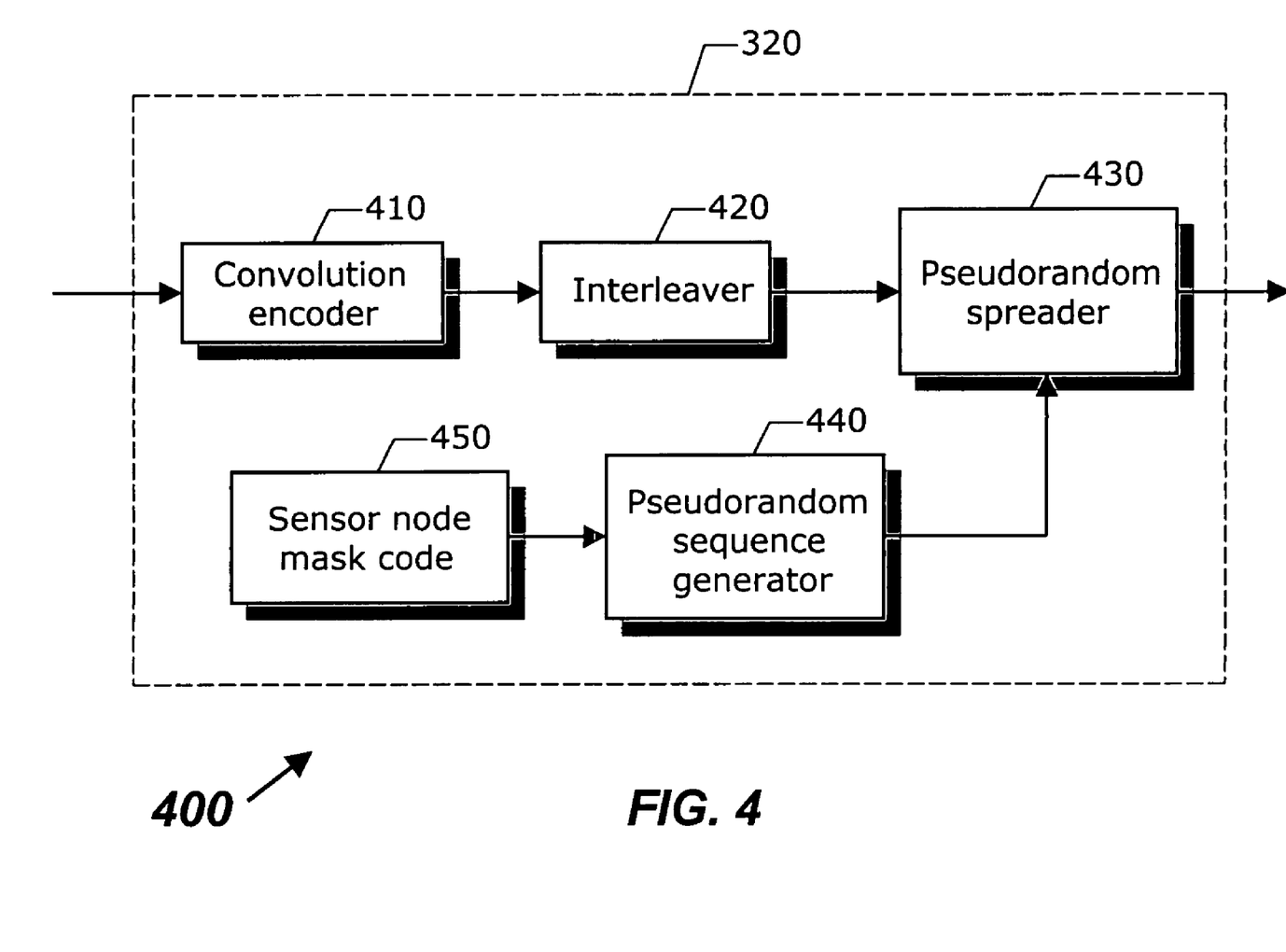
FIG. 4 is a detailed block of showing a FEC, interleaver, and spreading of the MIMO transceiver according to some embodiments.

Referring to FIG. 4 is a detailed block diagram 400 of showing the FEC, interleaver and spreading 320 according to some embodiments. A convolution encoder 410 that is used to encode the sensor information data is coupled to an interleaver 420. The output of the convolution encoder 410 is interleaved by using the interleaver 420. Then, the output data of the interleaver 420 then feeds into a pseudorandom spreader 430. Using the output of the interleaver 420 with a long pseudorandom sequence, which is generated by using a pseudorandom sequence generator 440, uses the pseudorandom spreader 430 to perform scrambler. A sensor node mask code 450 is coupled to the pseudorandom sequence generator 440. The sensor node mask code 450 produces a unique mask sequence for the pseudorandom sequence generator 440. As a result, the long pseudorandom sequence, which is generated by the pseudorandom sequence generator 440, is also a unique sequence for the sensor node. In other words, a self-correlation of the long pseudorandom sequence is approximately equal to 1 while a correlation between the long pseudorandom sequence and other long pseudorandom sequences of other sensor nodes is close to 0.

Figure 5:
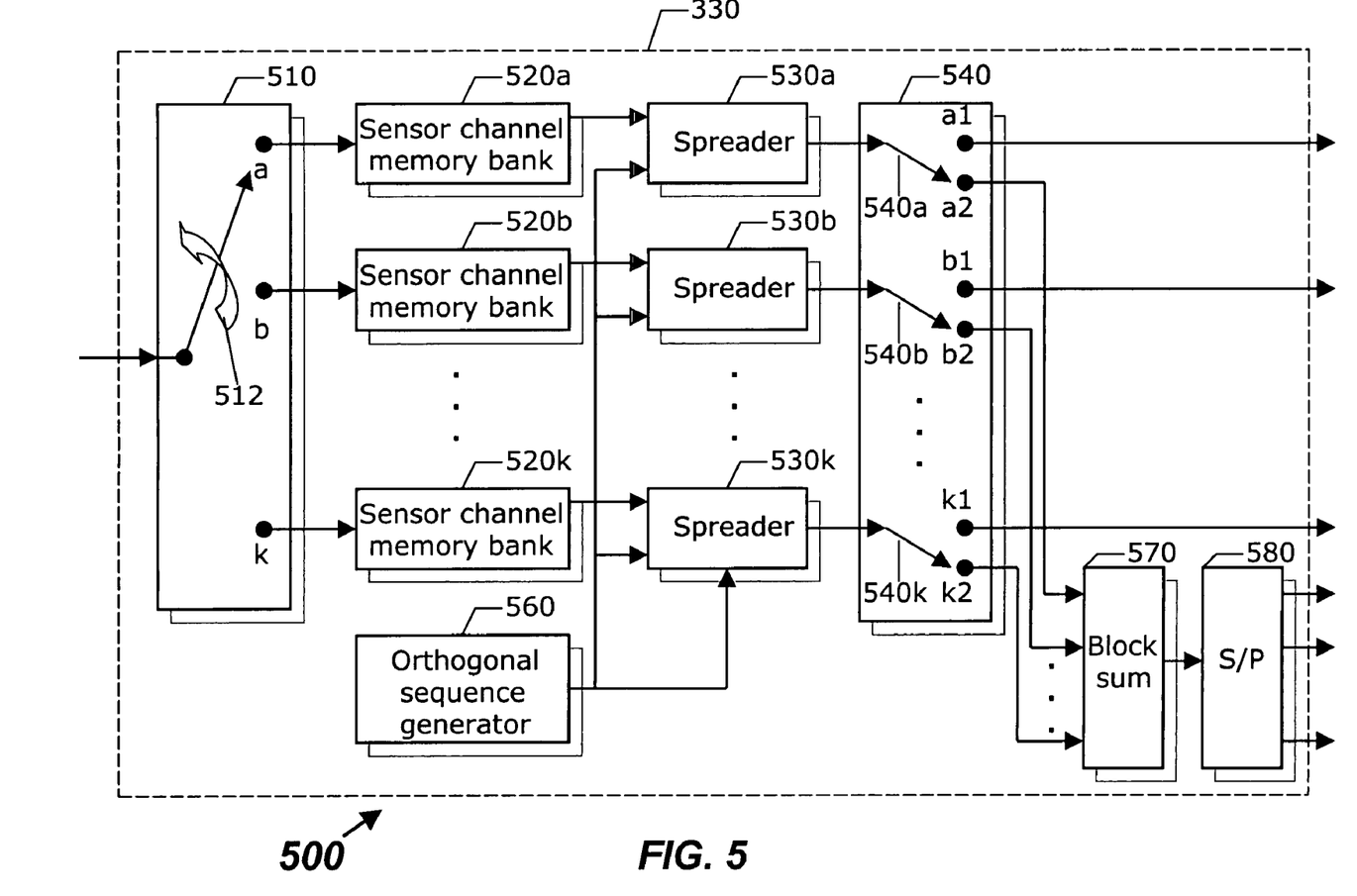
FIG. 5 is a detailed block diagram of showing a space-time encoding of the MIMO transceiver according to some embodiments.

Referring to FIG. 5 is a detailed block diagram 500 of showing the space-time encoding 330 of the MIMO sensor node and transceiver according to some embodiments. A counterclockwise multirate switch unit 510 contains a switch 512 that rotates in a counterclockwise direction from the position of "k" to the position of "a" at each of chip rate speed. The counterclockwise multirate switch unit 510 is used to perform down sampling processing and to divide a LN-length chip sequence of the input signal with a MN Mcps into N parallel sequences of a L-length chip with a M Megachips per second (Mcps). The switch 512 of the counterclockwise multirate switch unit 510 rotationally connects to one of N sensor channel memory banks from 520a to 520k at each of chip rate speed. All of the sensor channel memory banks from 520a to 520k have a size of L in memory. The chip rate of the data in each of the sensor channel memory banks from 520a to 520k is then M Mcps. The sensor channel memory banks from 520a to 520k are coupled to N spreaders from 530a to 530k in parallel. The N spreaders from 530a to 530k are used to spread the output sequences of the N sensor channel memory banks from 520a to 520k with N orthogonal sequences generated by an orthogonal sequence generator 560. The each of N orthogonal sequences has MN Mcps. Thus, the output sequences of the N spreaders from 530a to 530k also have the chip date with MN Mcps and are all orthogonal each other. The N spreaders from 530a to 530k are coupled to a dual-mode switch unit 540. The dual-mode switch unit 540 is used to form two functions either MIMO mode or single-input multiple-output (SIMO) mode. When switches of 540a, 540b, . . . , 540k are respectively connected to the positions of a1, b1, . . . , k1, the dual-mode switch unit 540 is in the MIMO mode. The paralleled output sequences of the N spreaders from 530a to 530k directly feed into a transmitter. When switches of 540a, 540b, . . . , 540k are respectively connected to the positions of a2, b2, . . . , k2, the dual-mode switch unit 540 is in the SIMO mode. In this case, the dual-mode switch unit 540 connects to a block sum unit 570, which performs a block summation for all of the output sequences from the N spreaders. The block sum unit 570 is coupled to a serial-to-parallel (S/P) unit 580 that is used to generate N parallel chip sequences for the transmitter.

MIMO Sensor Basestation Architecture

Figure 6:
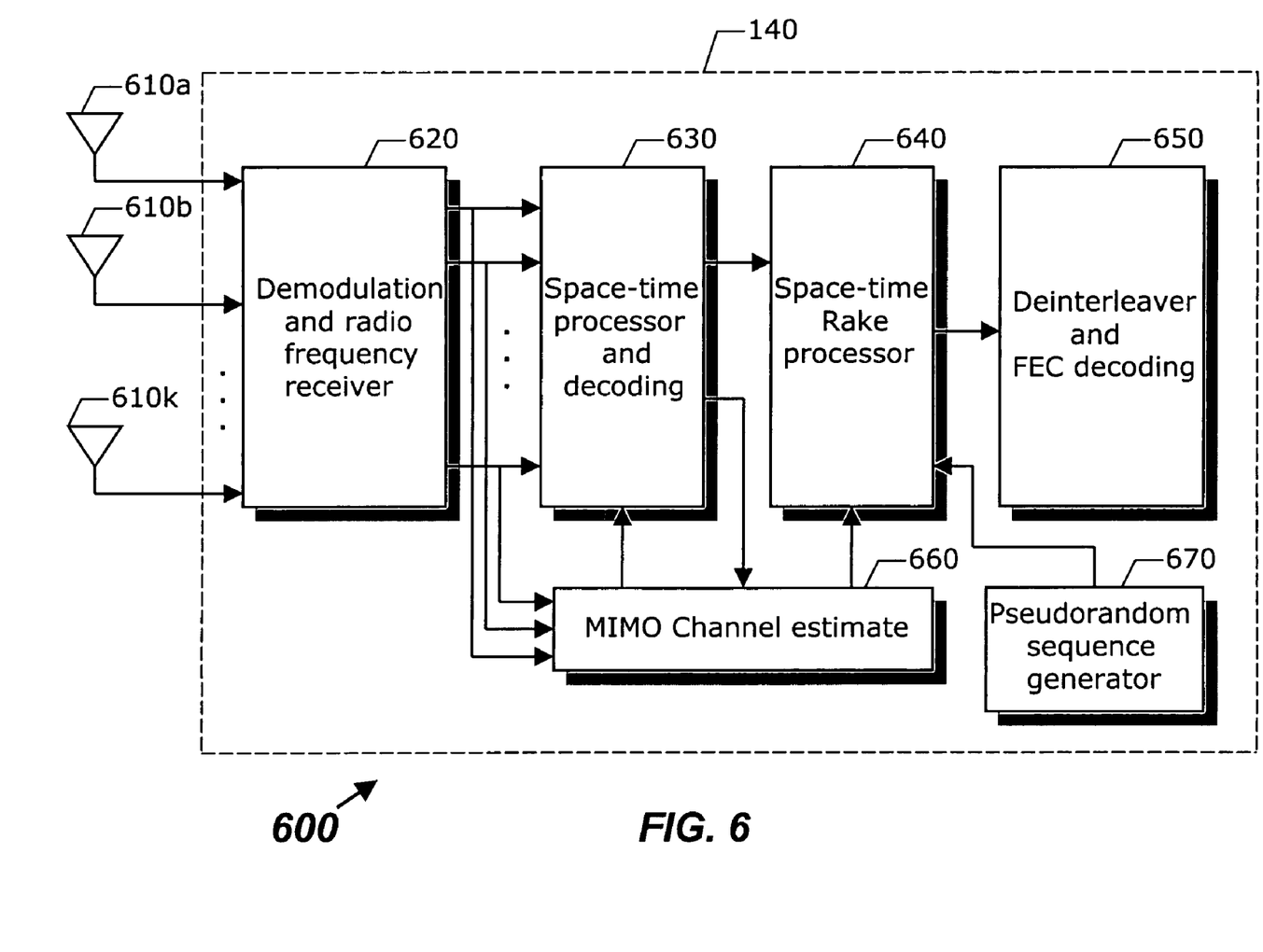
FIG. 6 is a block diagram of showing a MIMO sensor basestation according to some embodiments.

FIG. 6 is a detailed block diagram 600 of showing the MIMO sensor basestation transceiver 140 according to some embodiments. A K multiple antenna receiver from 610a to 610k are connected with a demodulation and radio frequency receiver 620. The demodulation and radio frequency receiver 620 produces K signals in parallel and feed them into a space-time processor and decoding 630. At same time, the demodulation and radio frequency receiver 620 also passes K paralleled signals into a MIMO channel estimate 660. The MIMO channel estimate 660 is used to identify MIMO channel characteristics by using either a training sequence or a blind estimate method. The space-time processor and decoding 630 is used to decode the MIMO signal into one single signal and then feeds it into a space-time rake processor 640 and the MIMO channel estimate 660. The MIMO channel estimate 660 provides the channel information for the space-time processor and decoding 630 and the space-time Rake processor 640. The space-time Rake processor 640 performs correlation, weighting, and coherent combination of the input signal and produces an output signal of the interest. A pseudorandom sequence generator 670 produces a unique pseudorandom sequence based on the sensor node information and passes it into the space-time Rake processor 640. The space-time Rake processor 640 is also coupled to a deinterleaver and FEC decoding 650, which is used to do deinterleaver and perform Viterbi processing to decode the information bits of the sensing node data.

Figure 7:
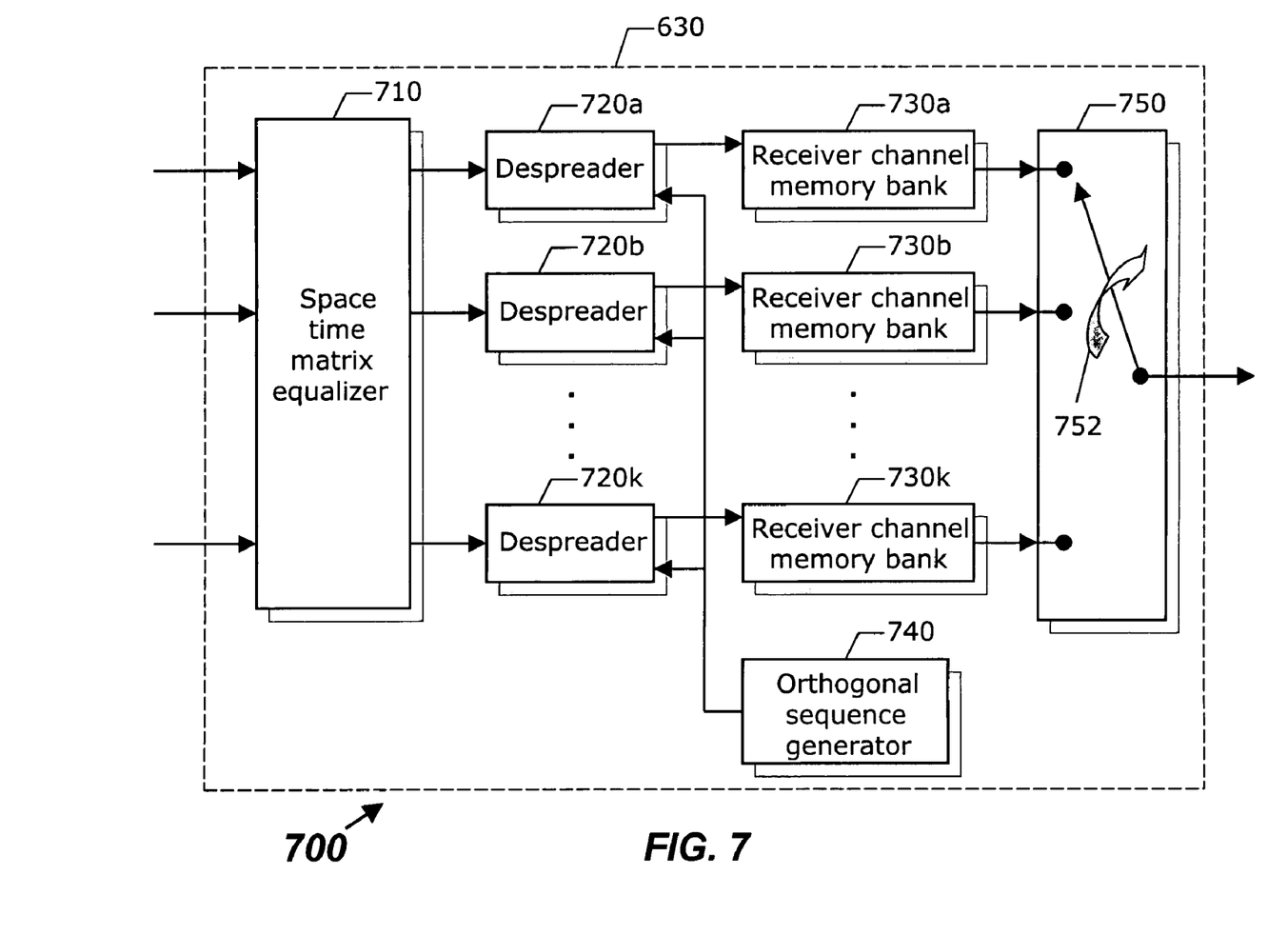
FIG. 7 is a detailed block diagram of showing a space-time processor and decoding of the MIMO sensor basestation according to some embodiments.

Referring to FIG. 7 is a detailed block diagram 700 of showing the space-time processor and decoding 630 of the MIMO sensor basestation transceiver according to some embodiments. The K paralleled inputs are passed into a space-time matrix equalizer 710, which is a minimum mean-square error (MMSE) equalizer. The space-time matrix equalizer 710 is used to cancel co-channel interference (CCI) in the spatial domain and ISI either in the space domain or in the time domain depending on where it can be done more efficiently. The outputs of the space-time matrix equalizer 710 are parallel despread with K orthogonal sequences generated by an orthogonal sequence generator 740 by using K despreaders from 720a to 720k. The despread K sequences are then fed into K receiver channel memory banks from 730a to 730k. The K receiver channel memory banks for 730a to 730k are coupled to a clockwise switch unit 750. The clockwise switch unit 750 produces a single signal sequence from the outputs of K receiver channel memory banks 730a to 730k by rotating a switch 752 at chip rate speed. This clockwise switch unit 750 is equivalent to perform an up-sampling processing.

Power Saving Operation for MIMO Sensor Nodes

The space-time sensor node that is a microelectronic device usually has a limited power supply. In some cases, replacement of power resource may be impossible. Thus, the lifetime of the space-time sensor node is depended on a battery lifetime. The malfunctioning of several space-time sensor nodes may cause significant topological changes so that rerouting of packets and reorganization of the sensor networks is needed. Therefore, power conservation and power management is important in the MIMO sensor node networks communication.

The present invention of the space-time sensor nodes has a power saving modes during operation. The power saving modes in the space-time sensor nodes includes: (1) full operation mode; (2) sleep mode; (3) wake-up mode, and (4) partial operation mode. In the full operation mode, the space-time sensor node performs entire operation including sensing, data processing and control, and transmitting and receiving. In the sleep mode, the space-time sensor node is in idle. In the wake-up mode, the space-time sensor node randomly wakes up during setup and turns space-time radio off while in inactive. Furthermore, when the space-time sensor node is in the partial operation mode, the space-time sensor node may only operate sensing and simple processing. If the observed data is important, then the space-time sensor node is switched to the full operation mode.

While the present inventions have been described with respect to a limited number of embodiments, those skilled in the art will appreciate numerous modifications and variations therefrom. It is intended that the appended claims cover all such modifications and variations as fall within the true spirit and scope of these present inventions.

What is claimed is:

1. A multiple-input multiple-output wireless sensor networks communication system comprising:
    N wireless sensor node and transceiver systems, where N is an integer greater than one;
    each of the wireless sensor node and transceiver systems coupled to M antennas, where M is an integer greater than one;
    said each of the wireless sensor node and transceiver systems further includes a sensor array unit, an analog-to-digital converter unit, a signal processing and data computing unit, a multiple-input multiple-output space-time transceiver, a memory bank, a power unit, and a power generator;
    a wireless multiple-input multiple-output space-time sensor basestation system coupled to a sensor network interface that is connected to a sensor network; and
    said wireless multiple-input multiple-output space-time sensor basestation system coupled to P antennas, where P is an integer greater than one.

2. The multiple-input multiple-output wireless sensor networks communication system of claim 1 wherein said sensor array unit includes N sensors in parallel, where N is an integer greater than one.

3. The multiple-input multiple-output wireless sensor networks communication system of claim 2 wherein each of the N sensors in parallel is a multifunction sensor device that can be used to sensor different input signals.

4. The multiple-input multiple-output wireless sensor networks communication system of claim 1 wherein said multiple-input multiple-output space-time transceiver further comprises a sensing data sequence stream, a forward error correction, interleaver and spreading, a space-time encoding, a modulation and radio frequency transmitter, and N antennas, where N is an integer greater than one.

5. The multiple-input multiple-output wireless sensor networks communication system of claim 4 wherein said forward error correction, interleaver and spreading further includes a convolution encoder, an interleaver, a pseudorandom spreader, a sensor node mask code, and a pseudorandom sequence generator.

6. The multiple-input multiple-output wireless sensor networks communication system of claim 4 wherein said space-time encoding further includes a counterclockwise multirate switch unit, K sensor channel memory banks, K spreaders, an orthogonal sequence generator, a dual-mode switch unit, a block sum, and a serial-to-parallel, where K is an integer greater than one.

7. The multiple-input multiple-output wireless sensor networks communication system of claim 6 wherein said counterclockwise multirate switch unit is an interleaver down-sampling operation to produce K parallel sequences of a length of L/K with a chip rate of M Mcps from a single input sequence of a length of L with a chip rate of KM Mcps, where K and L are integers greater than one.

8. The multiple-input multiple-output wireless sensor networks communication system of claim 6 wherein said dual-mode switch unit is used to form either multiple-input multiple-output or single-input multiple-output followed by the block sum and the serial-to-parallel.

9. The multiple-input multiple-output wireless sensor networks communication system of claim 6 wherein said orthogonal sequence generator produces all of the sequences with orthogonal each other.

10. The multiple-input multiple-output wireless sensor networks communication system of claim 6 wherein said each of K spreaders is an exclusive-OR (XOR) operation.

11. A multiple-input multiple-output space-time sensor basestation system comprising:
- N antennas coupled to a demodulation and radio frequency receiver, where N is an integer greater than one;
- the demodulation and radio frequency receiver coupled to a space-time processor and decoding, and a multiple-input multiple-output channel estimate;
- the space-time processor and decoding coupled to a space-time Rake processor and the multiple-input multiple-output channel estimate;
- the space-time Rake processor coupled to a deinterleaver and forward error correction decoding;
- the multiple-input multiple-output channel estimate is connected to the space-time processor and decoding and the space-time Rake processor; and
- a pseudorandom sequence generator coupled to the space-time Rake processor.

12. The multiple-input multiple-output space-time sensor basestation system of claim 11 wherein said space-time processor and decoding further includes a space-time matrix equalizer, K despreaders, K receiver channel memory banks, a clockwise multirate switch unit, and an orthogonal sequence generator, where K is an integer greater than one.

13. The multiple-input multiple-output space-time sensor basestation system of claim 12 wherein said space-time matrix equalizer is a space-time minimum mean square error (MMSE) equalizer.

14. The multiple-input multiple-output space-time sensor basestation system of claim 12 wherein said clockwise multirate switch unit is a deinterleaver up-sampling operation to form a single sequence of a length of L with KM Mcps from K parallel sequences of a length of L/K with M Mcps, where L and K are integers greater than one.

15. A wireless multiple-input multiple-output sensor node and transceiver system comprising:
- a sensor array unit coupled to an analog-to-digital converter unit;
- the analog-to-digital converter unit coupled to a signal processing and data computing unit;
- the signal processing and data computing unit coupled to a multiple-input multiple-output space-time transceiver that is connected to N antennas, where N is an integer greater than one;
- a memory bank coupled to the analog-to-digital converter unit, the signal processing and data computing unit, and the multiple-input multiple-output space-time transceiver;
- a power generator coupled to a power unit; and
- the power unit coupled to the sensor array unit, the analog-to-digital converter unit, the signal processing and data computing unit, and the multiple-input multiple-output space-time transceiver.

16. The wireless multiple-input multiple-output sensor node and transceiver system of claim 15 wherein said power generator is one of type powers including sunlight solar cells, low-power DC source, or any combinations.

17. The wireless multiple-input multiple-output sensor node and transceiver system of claim 15 wherein said power unit has four operation modes including a full operation mode, a sleep mode, a wake-up mode, and a partial operation mode.

18. The wireless multiple-input multiple-output sensor node and transceiver system of claim 17 wherein said partial operation mode is used to operate anyone of units including the sensor array unit, the analog-to-digital converter unit, the signal processing and data computing unit, the memory bank, the multiple-input multiple-output space-time transceiver, or any combinations.

19. The wireless multiple-input multiple-output sensor node and transceiver system of claim 15 wherein said the analog-to-digital converter unit includes N analog-to-digital converters in parallel, where N is an integer greater than one.

20. The wireless multiple-input multiple-output sensor node and transceiver system of claim 19 wherein said N analog-to-digital converters in parallel can be operated in full or in partial.

21. The wireless multiple-input multiple-output sensor node and transceiver system of claim 15 wherein said sensor array unit contains N parallel sensors, where N is an integer greater than one.

22. The wireless multiple-input multiple-output sensor node and transceiver system of claim 21 wherein said N parallel sensors can be fully or partially operated.

* * * * *